United States Patent [19]
Andrews

[11] Patent Number: 5,931,990
[45] Date of Patent: Aug. 3, 1999

[54] TANK FOR REMOVING UNABSORBED GAS FROM A MIXTURE OF UNABSORBED GAS AND LIQUID

[75] Inventor: Steven L. Andrews, Mississauga, Canada

[73] Assignee: Coronator, Woodbridge, Canada

[21] Appl. No.: 08/984,398

[22] Filed: Dec. 3, 1997

[51] Int. Cl.⁶ .................................................. B01D 19/00
[52] U.S. Cl. .............................. 96/163; 96/165; 96/197; 96/220
[58] Field of Search .............................. 95/241, 243, 254, 95/262; 96/163, 165, 197, 204, 206, 207, 215, 220; 210/188, 750

[56] References Cited

U.S. PATENT DOCUMENTS

| 1,055,549 | 3/1913 | McIntosh | 96/215 |
|---|---|---|---|
| 1,127,722 | 2/1915 | Beckley | 96/220 |
| 1,255,018 | 1/1918 | Jones | 96/165 |
| 1,255,395 | 2/1918 | Duram | 96/206 |
| 1,684,834 | 9/1928 | Larsen | 96/204 |
| 1,775,362 | 9/1930 | Demarcus | 96/204 |
| 2,721,620 | 10/1955 | Geer et al. | 96/215 |
| 2,968,610 | 1/1961 | Bergstrom | 210/188 |
| 3,747,302 | 7/1973 | Frayssinoux | 96/207 |
| 4,072,481 | 2/1978 | Laval, Jr. | 96/182 |
| 4,102,655 | 7/1978 | Jeffery et al. | 210/188 |
| 4,572,821 | 2/1986 | Brodard et al. | 422/547 |
| 4,624,687 | 11/1986 | Pere | 96/215 |
| 4,687,494 | 8/1987 | Escobal | 210/188 |
| 4,827,725 | 5/1989 | Morse | 96/206 |
| 4,878,924 | 11/1989 | Yano et al. | 210/188 |
| 4,919,826 | 4/1990 | Alzner | 210/188 |
| 5,032,292 | 7/1991 | Conrad | 210/764 |
| 5,286,389 | 2/1994 | Hardison | 210/750 |
| 5,302,298 | 4/1994 | Leitzke | 210/748 |
| 5,376,265 | 12/1994 | Szabo | 210/188 |
| 5,380,471 | 1/1995 | Ban et al. | 261/122.1 |
| 5,474,749 | 12/1995 | Takeda | 422/186.07 |
| 5,494,576 | 2/1996 | Hoppe et al. | 210/198.1 |

*Primary Examiner*—Duane S. Smith
*Attorney, Agent, or Firm*—Michael Best & Friedrich LLP

[57] ABSTRACT

A tank for removing unabsorbed gas from a mixture of unabsorbed gas and liquid. The tank has an inlet pipe that carries an unabsorbed gas and liquid mixture into the tank. A deflector is located at the exit of the inlet pipe so that when the unabsorbed gas and liquid mixture strikes the deflector there is a rapid reduction of flow velocity of the mixture and a directional change of flow of the mixture. A separation chamber, in the form of a cylinder, extends at one end into a gas pocket and at the other end into the mixture at the bottom of the tank past the deflector so that once the mixture hits the deflector the less dense unabsorbed gas is directed generally upwards. When it reaches the top of the separation chamber the unabsorbed gas passes into the gas pocket. A liquid retention chamber is defined by the wall of a second cylinder and an outlet pipe. The second cylinder is concentrically placed around the first cylinder such that the wall of the second cylinder extends to a height below the wall of the first cylinder and below the height of the mixture in the tank.

17 Claims, 2 Drawing Sheets

TANK FOR REMOVING UNABSORBED GAS FROM A MIXTURE OF UNABSORBED GAS AND LIQUID

FIELD OF INVENTION

The present invention relates to a tank for removing unabsorbed gas from a mixture of unabsorbed gas and liquid. In particular, the present invention relates to a tank for removing unabsorbed ozone gas from water.

BACKGROUND

There are many apparatuses and processes in which gases are used to treat water, including the treatment of water with ozone. As a consequence of this treatment, these processes result in to water which contains unabsorbed gas. The unabsorbed gas in the water then has to be separated out of the water. In particular, in many jurisdictions there are strict regulations as to the maximum amount of unabsorbed gas such as ozone which can be present in the water after treatment. For example, in the pool and spa industry, the unabsorbed ozone gas levels allowed in the water arm strictly regulated.

Many of the prior art devices for removing unabsorbed gases from a liquid have generally been very large devices which involve a degassing tank which is operated at atmospheric pressure. The tank often employs a system of complicated baffles or other structural elements which are used to create turbulence in the mixture. The turbulence facilitates the physical separation of the gas from the liquid. For example, in U.S. Pat. No. 1,055,549 to McIntosh there is described an apparatus for separating gas from liquid wherein the gas is separated from the liquid in an apparatus in which a series of horizontal flanges are placed in a circular fashion around an inlet pipe. The exit to the inlet pipe is placed in the air space above the liquids. As the liquid exits the inlet pipe, it cascades over the flanges creating turbulence in the liquid which facilitates the release of gas from the liquid. The gas is then collected and piped away for further use. The liquid is collected in an overflow pipe.

In U.S. Pat. No. 5,380,471 to Ban et al., an aeration tank for producing ultrapure water is described in which the unreacted/unabsorbed gas is separated from water which has been treated with aeration gas. The gas is separated from the water by passing the water around the bottom and top of vertical partitions which are placed in a tank. The water passes around these partitions creating turbulence causing the gas to separate out of the water.

U.S. Pat. No. 5,302,298 to Leitzke describes a process for treating liquids charged with pollutants which includes treating the liquid with ozone gas. Part of the process includes passing the liquid over walls of a tank by releasing the unabsorbed gas into the air space above the tank which is then drawn out of the vessel through an outlet line.

Other prior art devices have simply incorporated means for venting the unabsorbed gas from a collection chamber containing the mixture of unabsorbed gas and liquid. For example, in U.S. Pat. No. 5,376,265 to Szabo, there is described an ozone/water contactor which includes an off-gas collector. The off-gas collector comprises a housing in which the treated water is collected. Within the housing is a float with a needle valve which operates together with an aperture in the roof of the housing to either close the aperture or vent the unabsorbed gas. As the unabsorbed ozone gas is released into the housing it displaces the liquid. The float with a needle valve moves downwards with the displaced liquid removing the needle valve from the aperture in the roof of the housing. The gas escapes through the aperture. Once the gas is released, the water collects in the housing again causing the float and needle valve to rise blocking the aperture. This housing essentially acts as a collecting and venting chamber. There is no means described in this patent to facilitate the physical separation of the gas from the water.

These prior art devices have failed to effectively remove substantially all of the unabsorbed gases from the liquid. Additionally, the prior art devices are also generally large and cumbersome which make them difficult to use in smaller applications.

SUMMARY OF THE INVENTION

According to one aspect of the present invention there is provided a tank for removing unabsorbed gas from a liquid. In a preferred embodiment of the present invention, there is provided a tank for removing unabsorbed ozone from water.

According to another aspect of the present invention there is provided an enclosed tank for removing unabsorbed gas from a liquid wherein the tank comprises an inlet pipe which has an exit in the tank a separation chamber, a deflecting means, a liquid control means for controlling the height of the mixture in the tank and an outlet pipe. The separation chamber is defined by a wall of a first cylindrical structure which is concentrically placed around the inlet pipe and wherein the wall of the cylindrical structure extends downwards past the exit on the inlet pipe and upwards to a height above the height of the mixture. The deflecting means is situated near said exit of add inlet pipe wherein said mixture exiting said exit on said inlet pipe impinges on said deflecting means causing a rapid reduction in the velocity of said mixture and a change in the flow direction of the mixture whereby said unabsorbed gas flows upwards into said separation chamber. The entrance to the outlet pipe is preferably situated at the bottom of the tank.

In an embodiment of the present invention there is provided a tank for removing unabsorbed gas from a mixture of unabsorbed gas and liquid wherein said deflecting means comprises a deflector plate.

According to another aspect of the present invention there is provided an enclosed tank for removing unabsorbed gas from liquid wherein the tank comprises; an inlet pipe which carries an unabsorbed gas and liquid mixture into the tank; a deflector plate which is located at the exit of the inlet pipe so that when the unabsorbed gas and liquid mixture strikes the deflector plate there is a rapid reduction of flow velocity of the mixture and a directional change of flow of the mixture; a separation chamber which is in the form of a first cylindrical structure in which one end extends into a gas pocket and the other end extends into the mixture at the bottom of the tank past the deflector plate so that once the mixture hits the deflector plate the less dense unabsorbed gas is directed generally upwards within the separation chamber wherein at the top of the separation chamber the unabsorbed gas passes into the gas pocket; a liquid retention chamber which is defined by the wall of a second cylindrical structure which is concentrically placed around the first cylindrical structure wherein the wall of the second extends upwards to a height below the wall of the first cylindrical structure and below the height of the mixture in the tank; and an outlet pipe.

In an embodiment of the present invention there is provided an enclosed tank for removing unabsorbed gas from a mixture of unabsorbed gas and liquid wherein the tank operates under pressure and wherein the height of the mixture in the tank is controlled by a floating gas vent.

According to another aspect of the present invention there is provided an enclosed tank for removing unabsorbed gas from a mixture of unabsorbed gas and liquid wherein the tank comprises an inlet pipe with an exit in the tank, a separation chamber, a liquid retention chamber, liquid control means to control the height of the mixture above the wall on the second cylindrical structure defining the liquid retention chamber and below the wall on the first cylindrical structure defining the separation chamber, a deflector plate, and an outlet pipe, wherein the mixture is discharged at the exit of the inlet pipe at a minimum velocity of 10 ft/sec and on impingement on the deflector plate the velocity of the mixture is rapidly reduced to a maximum of 1 ft/sec. The direction of the flow of the mixture is also changed when the mixture impinges the deflector plate causing the mixture to enter the separation chamber.

BRIEF DESCRIPTION OF THE DRAWINGS

The following figures are illustrations of an embodiment of the present invention and are in no way intended to limit the scope of the invention.

DETAILED DESCRIPTION

Figure 1:
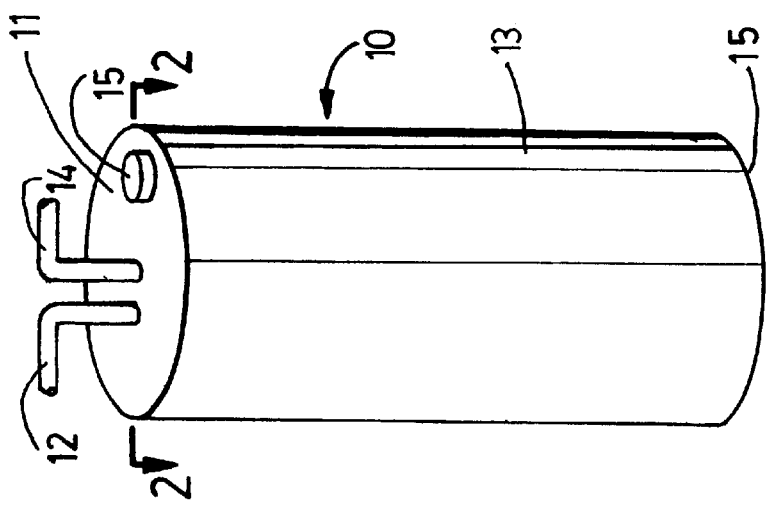
FIG. 1 is an illustration of a perspective view of the tank for separating unabsorbed gas from an unabsorbed gas and liquid mixture.

Referring to FIG. 1, a tank for separating unabsorbed gas from liquid is shown at 10. The tank has a top 11, side walls 13 and a bottom 15.

There is an inlet pipe 12 for carrying the unabsorbed gas and liquid mixture into the tank and an outlet pipe 14 for carrying the liquid out of the tank. The inlet pipe 12 is sized so that the inlet velocity of the unabsorbed gas and liquid is a minimum of approximately 10 ft/sec.

A floating gas vent 16 is located at the top of the tank. The floating gas vent 16 regulates the gas pocket inside the top of the tank 10 and thereby regulates the height 17 of the mixture/liquid inside the tank 10.

Generally, the tank 10 can be quite small compared to the volume throughput of the mixture because the functioning of the tank 10 and its ability to degas the mixture is mainly dependent on the velocity of the mixture. However, for very large continuous throughputs a larger tank 10 and inlet pipe 12 is desirable so that more volume of liquid can be treated at one time.

Figure 2:
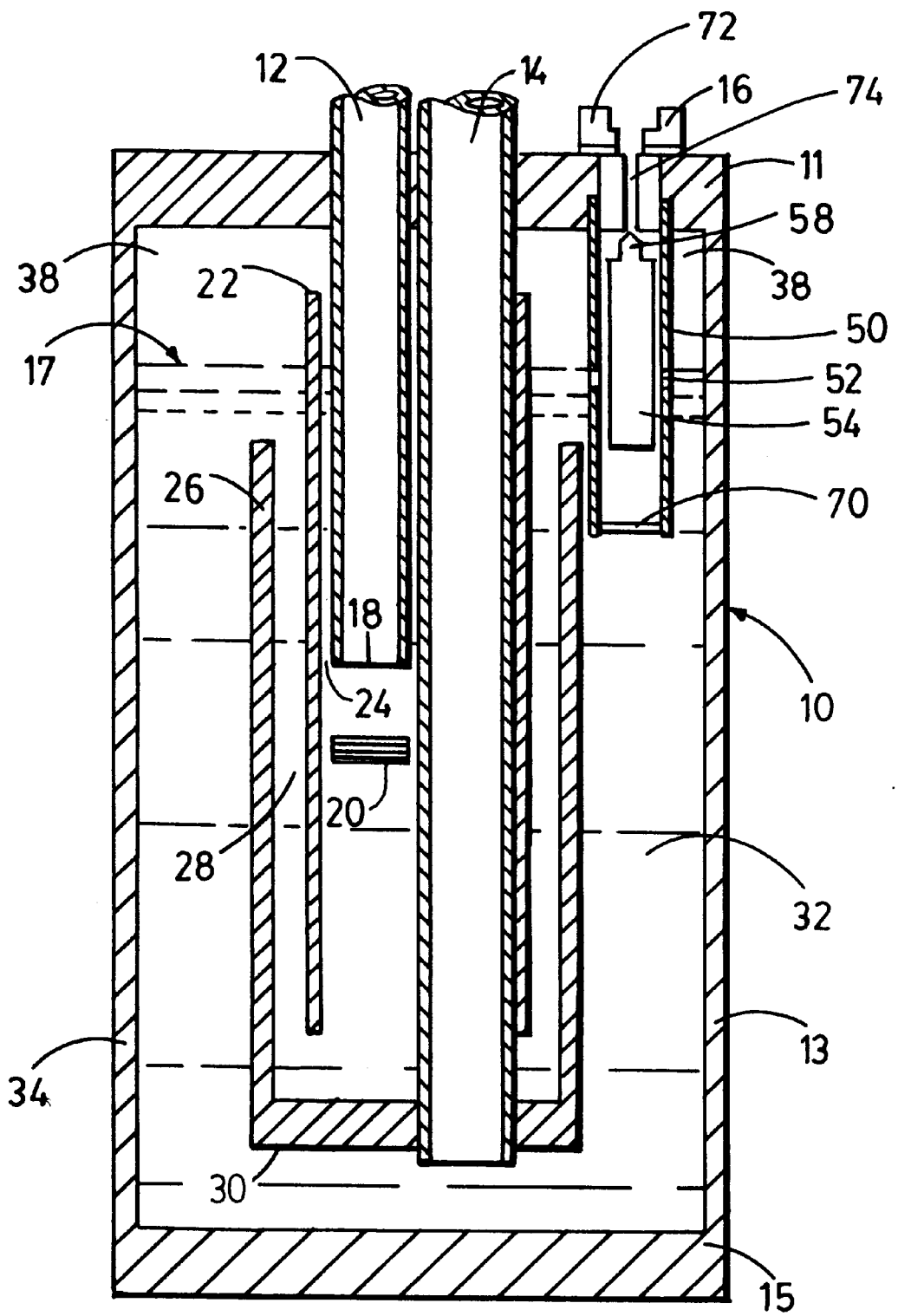
FIG. 2 is an illustration of a partial cross-sectional view of the tank of FIG. 1 taken along lines 2—2.

Referring to FIG. 2, inlet pipe 12 is vertically positioned and extends into tank 10. The exit 18 of inlet pipe 12 is located in the tank 10. At the exit 18 of inlet pipe 12 there is located a deflector plate 20.

Surrounding the inlet pipe 12 is a first cylindrical structure 22 defining the gas separation chamber 24. The walls of the first cylindrical structure 22 extend below the deflector plate 20 and above the height 17 of the liquid into a gas pocket 38. Accordingly, the gas separation chamber 24 is essentially the interior area inside the walls of the first cylindrical structure 22.

Surrounding the first cylindrical structure 22 is a second cylindrical structure 26 defining the liquid retention chamber 28. The walls of the second cylindrical structure 26 extend downwards past the walls of the first cylindrical structure 22 to a closed bottom end 30 and upwards into the liquid below the height 17 of the liquid and the gas pocket 38. Accordingly, the liquid retention chamber 28 is the area in between the walls of the first cylindrical structure 22 and the second cylindrical structure 26 which is closed off at the bottom by the closed bottom end 30.

Outside the walls of the second cylindrical structure 26 is the collection chamber 32. The collection chamber 32 is defined by the area containing the liquid between the walls of the second cylindrical structure 26 and the walls 13 and bottom end 15 of the tank 10.

The outlet pipe 14 is situated at the bottom of the collection chamber and carries the liquid out of the tank 10. The liquid exiting the tank 10 through outlet pipe 14 has very little, if any, detectable residual amount of unabsorbed gas.

The inlet pipe 12 is sized to deliver the unabsorbed gas and liquid mixture at a minimum rate of approximately 10 ft/sec. When the mixture exits the inlet pipe at 18 at a minimum rate of approximately 10 ft/sec it strikes the deflector plate 20. On impact with the deflector plate 20, the mixture immediately undergoes a rapid reduction in velocity and a change in the flow direction. Generally, it is desirable to reduce the velocity of the mixture at the deflector plate 20 from a minimum rate of approximately 10 ft/sec to a maximum velocity of approximately 1 ft/sec. The deflector plate 20 also causes the mixture to travel upwards within the separation chamber 24. In particular, the deflector plate 20 causes the unabsorbed gas to travel upwards within the separation chamber 24.

This rapid reduction of velocity and change of flow in the mixture causes the unabsorbed gas to separate from the liquid. As the unabsorbed gas rises to the top of the separation chamber 24 it escapes from the liquid into the gas pocket 38. The walls of the first cylindrical structure 22 extend into the gas pocket 38 preventing the liquid from entering into the space above the separation chamber 24 and over the walls of the first cylindrical structure 22. Accordingly, the liquid and any remaining unabsorbed gas which remains trapped in the liquid travel around the bottom end walls of the first cylindrical structure 22 of the separation chamber 24 and into the liquid retention chamber 28. The liquid and any remaining unabsorbed gas travel vertically upwards then and over the top end of the walls of the second cylindrical structure 26 of the liquid retention chamber 28 and into the collection chamber 32 and out the outlet pipe 14.

When the liquid travels over the top end of the walls of the second cylindrical structure 26 the turbulence causes most of the remaining unabsorbed gas to escape from the liquid and into the gas pocket 38. It has been observed that the separation of the unabsorbed gas from the liquid at the top end of the walls of the second cylindrical structure 26 is best facilitated when the wall of the second cylindrical structure is maintained just below the gas pocket 38 so that there is a very fine film of liquid over the top of the walls of the second cylindrical structure 26.

The floating gas vent 16 regulates the gas pocket 38. The gas pocket 38 must be regulated so that the proper height 17 of the liquid is maintained. Otherwise, if the proper height 17 of the liquid is not retained so that the top end of the wall of the first cylindrical structure 22 is not kept in the gas pocket 38 above the height 17 of the liquid than the tank will not operate properly and the unabsorbed gas will not separate out of the liquid. Similarly, if the proper height 17 of the liquid is not maintained and the top end of the wall of the second cylindrical structure 26 is not kept below the gas pocket 38 and below the height 17 of the liquid this separation process will also not operate properly.

Figure 3:
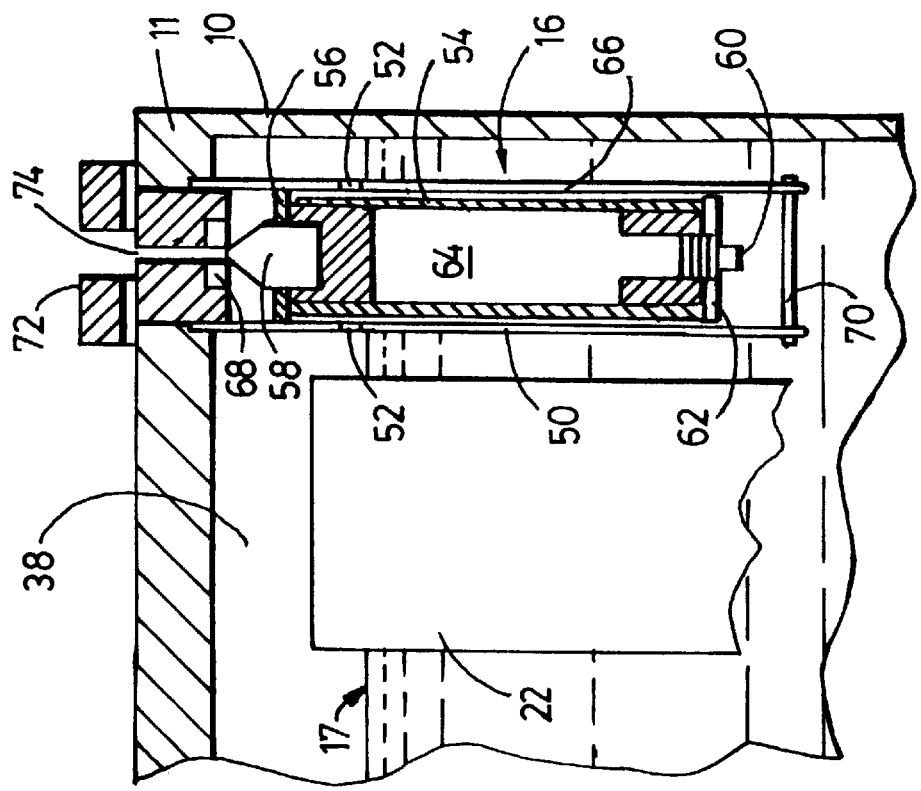
FIG. 3 is an illustration of a cross-sectional view of the floating gas vent of the tank of FIG. 1.

Referring to FIG. 2 and FIG. 3, the floating gas vent 16 is illustrated. The floating gas vent 16 is comprised of a tubular structure 50 in which one or more vent opening 52 are situated in the side walls of the tubular structure 50. In a preferred embodiment, the openings 52 are located just below the top walls of the first cylindrical structure 22 defining the separation chamber 24.

The top end of the walls of the tubular structure 50 are attached to the top 11 of the tank 10.

Inside the tubular structure 50 is a weighted float 54. The upper end of float 54 has an upper end plug 56 in which a needle valve 58 is located. The upper end plug 56 is designed to fit snugly inside the diameter of the tubular structure 50 to properly guide the needle valve 58 into opening 74 to close opening 74 when the float 54 is in the upward position. At the lower end of float 54 is a second plug 60 which is removable from the bottom plate 62 of the float 54. Inside the float is an empty chamber 64 in which material, such as sand, may be added or removed to increase or decrease the weight of the float 54. The material is added or removed through the bottom end of float 54 by removing the second plug 60 in the bottom of the float 54.

There is a space 66 between the tubular structure 50 and the float 54 and there is a screw 70 extending across the bottom open end of the tubular structure to prevent the float 54 from falling down into the tank 10.

At the top end of the tubular structure 50 there is a replaceable seat 68 which is attached to a vent fastener 72. The seat 68 and vent fastener 72 have an opening 74 extending therethrough. Vent fastener 72 can be removed from the top 11 of the tank 10 to allow access to the weighted float 54.

When the float sits in the liquid so that the openings 52 are located in the gas pocket 38 just above the height 17 of the liquid the gas from the gas pocket 38 enters the space 66 through the openings 52. As the gas enters the space 66 it causes the downward displacement of the liquid retained within the space 66. As the liquid is displaced by the unabsorbed gas entering the gas pocket 38 and the space 66, the float 54 drops downward into the tubular structure 50. At some point after the float 54 begins to descend downwards in the tubular structure 50 the needle valve 58 becomes disengaged from the seat 68 causing the gas to vent through the opening 74. The loss of gas in the space 66 causes the liquid to rise again in the space 66. As a result, the float 54 also rises again plugging the opening 74. In this manner, the floating gas vent 16 maintains the gas pocket and the liquid at a height 17 to ensure that the tank operates properly to separate hew unabsorbed gas from the liquid.

Depending on the design of the tank and the desired height 17 of the liquid, the weight of the float 54 can be adjusted by removing the vent fastener 72 and seat 68 from the top 11 of the tank 10. Once the vent fastener 72 and seat 68 are removed then the float 54 can be pulled out through this opening and by adding or removing material through the plug 60 the weight of the float 54 can be adjusted.

In a preferred embodiment of the invention, the minimum flow rate of the mixture is approximately 10 ft/sec on discharge at the exit 18 of the inlet pipe 12 which is reduced to a maximum flow rate of approximately 1 ft/sec on impingement with the deflector plate 20.

To achieve these desired flow rates and to maximize separation of the unabsorbed gas from the liquid, the following preferred ratios have been employed: the deflector plate 20 is spaced approximately one times the diameter of the inlet pipe from the exit 18 of the inlet pipe 12; the bottom 30 defining the bottom of the retention chamber 28 is spaced approximately six to eleven times the diameter of the inlet pipe from the deflector plate 20 and is spaced approximately one times the diameter of the inlet pipe from the bottom 15 of the tank 10; the bottom walls of the first cylindrical structure 22 defining the separation chamber 24 are spaced approximately five to ten times the diameter of the inlet pipe downwards from the deflector plate 20; the transverse cross-sectional area of the retention chamber 28 is bigger than the transverse cross-section area of the separation chamber 24 by approximately the transverse cross-sectional area of the inlet pipe 12; the transverse cross-sectional area of the collection chamber 32 is bigger than the transverse cross-sectional area of the liquid retention chamber 28 by approximately the transverse cross-sectional area of the inlet pipe 12; the diameter of the separation chamber 24 is approximately four times the diameter of the inlet pipe 12; the height of the liquid above the walls of the second cylindrical structure 26 defining the liquid retention chamber 28 is approximately one tenth to one times the diameter of the inlet pipe.

The above ratios are examples of preferred ratios for the design of the tank of the present invention. Other ratios may be used to obtain a tank according to the present invention which effectively removes unabsorbed gas from an unabsorbed gas and liquid mixture.

It has been observed that generally if the height of the wall of the second cylindrical structure 26 is such that there is only a thin film of the mixture travelling over this wall of the second cylindrical structure 26 then more unabsorbed gas will likely escape into the gas pocket 38.

It has also been observed that generally the greater the distance from the deflector plate 20 to the bottom of the wall of the first cylindrical structure 22 the less gas carry over to the liquid retention chamber 28. By minimizing the gas carry over into the liquid retention chamber the more gas there will be escaping into the gas pocket 38 at the top of the separation chamber 24.

Furthermore, it has been observed that if the deflector plate 20 is positioned too close to the exit 18 of the inlet pipe 14 there is not enough space between the exit 18 and the deflector plate 20 to allow the entrained gas to flow into the separation chamber 24. However, if the deflector plate 20 is positioned too far from the exit 18 the mixture will undergo frictional losses so that the mixture does not impinge the deflector plate 20 with enough force to effectively separate the gas from the liquid. Generally, it has been observed that if the mixture is discharged at a minimum of 10 ft/sec at the exit 18 of the inlet pipe 12 and on impingement on the deflector plate 20 a reduced velocity of a maximum of 1 ft/sec is achieved then the unabsorbed gas, to a large extent, separates effectively from the liquid and flows into the liquid separation chamber 24 from which it escapes out the top into the gas pocket 38.

The above embodiments are illustrations of the present invention. It would be readily understood by skilled persons in the art that modifications and changes could be made to these embodiments without departing from the spirit and scope of the invention as claimed below.

I claim:

1. An enclosed tank for separating unabsorbed gas from an unabsorbed gas and liquid mixture comprising:

an inlet pipe wherein the inlet pipe has an exit in said tank and wherein said inlet pipe introduces the mixture at a high velocity at said exit into said tank;

a separation chamber wherein said separation chamber is defined by a wall of a first cylindrical structure concentrically placed around said inlet pipe and wherein said wall of said cylindrical structure extend downwards past said exit on said inlet pipe and upwards to a height above the height of said mixture after said mixture is introduced into said tank;

deflecting means situated near said exit of said inlet pipe wherein said mixture exiting said exit on said inlet pipe impinges on said deflecting means causing a rapid reduction in the velocity of said mixture and a change in the flow direction of said mixture whereby said unabsorbed gas flows upwards into said separation chamber;

liquid control means for controlling said height of said mixture in the tank so that said height of said mixture is below the top of said wall of said first cylindrical structure; and an outlet pipe.

2. An enclosed tank according to claim 1 wherein said tank further comprises a liquid retention chamber wherein said liquid retention chamber is defined by a wall of a second cylindrical structure concentrically placed around said first cylindrical structure wherein the wall of said second cylindrical structure extends upwards to a height below said wall of said first cylindrical structure and below said height of said mixture after said mixture is introduced into said tank and said wall of said second cylindrical structure extends downwards past the wall of said first cylindrical structure to form an enclosed bottom end and wherein said liquid control means further controls said height of said mixture above said wall of said second cylindrical structure.

3. An enclosed tank according to claim 2 wherein said tank operates under pressure and wherein said liquid control means is a floating gas vent.

4. An enclosed tank according to claim 3 wherein said tank further comprises a collection chamber wherein said collection chamber is the space defined by the area in between the walls and bottom end of the tank and the wall and bottom end of the second cylindrical structure.

5. An enclosed tank according to claim 4 wherein said deflecting means comprises:

a deflector plate.

6. An enclosed tank according to claim 5 wherein the inlet pipe is sized to provide a mixture at a minimum velocity of 10 ft/sec. to the tank at said exit of said inlet pipe.

7. An enclosed tank according to claim 6 wherein said deflector plate is positioned from said exit such that the velocity of the mixture is reduced to a maximum of 1 ft/sec when the mixture impinges on said deflector plate.

8. An enclosed tank according to claim 7 wherein said deflector plate is positioned approximately one times the diameter of the inlet pipe from the exit of the inlet pipe.

9. An enclosed tank according to claim 7 wherein said bottom of said wall of said first cylindrical structure is spaced approximately five to ten times the diameter of said inlet pipe downwards from said deflector plate.

10. An enclosed tank according to claim 7 wherein said bottom of said liquid retention chamber is spaced approximately six to eleven times the diameter of said inlet pipe from said deflector plate and is spaced approximately one times said diameter of said inlet pipe from the bottom of said tank.

11. An enclosed tank according to claim 7 wherein said height of the mixture/liquid above the walls of the second cylindrical structure of said liquid retention chamber is approximately one tenth to one times the diameter of said inlet pipe.

12. An enclosed tank according to claim 7 wherein said liquid retention chamber has a first transverse cross-sectional area, said separation chamber has a second transverse cross-sectional area, and said inlet pipe has a third transverse cross-sectional area wherein said first transverse cross-sectional area of said liquid retention chamber should be bigger than said second transverse cross-sectional area of said separation chamber by approximately the transverse cross-sectional area of the inlet pipe.

13. An enclosed tank according to claim 7 wherein said collection chamber has a fourth transverse cross-sectional area wherein said fourth transverse cross-sectional area of said collection chamber is bigger than said first transverse cross-sectional area of the liquid retention chamber by approximately the said third transverse cross-sectional area of said inlet pipe.

14. An enclosed pressurized tank for separating gas from an unabsorbed gas and liquid mixture comprising:

an inlet pipe wherein the inlet pipe has an exit in said tank and wherein said inlet pipe introduces the mixture at a maximum velocity of 10 ft/sec at said exit into said tank;

a separation chamber wherein said separation chamber is defined by a wall of a first cylindrical structure concentrically placed around said inlet pipe and wherein said wall of said cylindrical structure extends downwards past said exit on said inlet pipe and upwards to a height above the height of said mixture after said mixture is introduced into said tank;

deflecting means situated near said exit of said inlet pipe wherein said mixture exiting said exit on said inlet pipe impinges on said deflecting means causing a rapid reduction in the velocity of 1 ft/sec of said mixture and a change in the flow direction of the mixture whereby said unabsorbed gas flows upwards into said separation chamber;

a liquid retention chamber wherein said liquid retention chamber is defined by a wall of a second cylindrical structure concentrically placed around said first cylindrical structure wherein the wall of said second cylindrical structure extends upwards to a height below said wall of said first cylindrical structure and below said height of said mixture after said mixture is introduced into said tank and said wall of said second cylindrical structure extends downwards past the wall of said first cylindrical structure to form an enclosed bottom end;

floating gas vent for controlling said height of said mixture in said tank so that said height of said mixture is below the top of said wall of said first cylindrical structure and said height of said mixture is above said wall of said second cylindrical structure; and an outlet pipe;

wherein after said mixture impinges said deflecting means, said unabsorbed gas rises in said separation chamber and escapes into said space above said height of said mixture creating a gas pocket in said space above said mixture.

15. An enclosed tank for separating gas from an unabsorbed gas and liquid mixture according to claim 14 wherein said height of said liquid is positioned above said wall of said second cylindrical structure to maximize turbulence and the escape of said unabsorbed gas into said gas pocket as said mixture travels over said wall of said second cylindrical structure and said height is no greater than one times the diameter of said inlet pipe above said wall of said second cylindrical structure.

16. An enclosed tank for separating gas from an unabsorbed gas and liquid mixture according to claim 15 wherein said floating gas vent is a weighted floating gas vent whereby the weight of the weighted floating gas vent can be adjusted.

17. An enclosed tank for separating gas from an unabsorbed gas and liquid mixture according to claim 16 wherein said floating gas vent has openings in the side thereof wherein said openings are below said wall of said first cylindrical structure and above said wall of said second cylindrical structure.

* * * * *